United States Patent
Pereira, III

(10) Patent No.: US 6,931,402 B1
(45) Date of Patent: Aug. 16, 2005

(54) PROFILING SYSTEM FOR CONTROLLING ACCESS FOR A PLURALITY OF USERS TO A PLURALITY OF OBJECTS LOCATED IN AT LEAST ONE ELECTRONIC DATABASE

(75) Inventor: Manuel Vasconcelos Pereira, III, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 09/514,227

(22) Filed: Feb. 28, 2000

(51) Int. Cl.⁷ .............................................. G06F 17/30
(52) U.S. Cl. .............................. 707/9; 10/102; 705/28; 709/203; 709/219
(58) Field of Search ............................. 707/9, 10, 103, 707/104, 102; 705/22, 26, 28; 709/203, 219

(56) References Cited

U.S. PATENT DOCUMENTS 5,977,964 A * 11/1999 Williams et al. ............. 345/721
6,005,571 A * 12/1999 Pachauri ...................... 345/671
6,029,174 A *  2/2000 Sprenger et al. ................ 707/1
6,029,195 A *  2/2000 Herz ............................ 707/10
6,058,391 A *  5/2000 Gardner ....................... 705/26
6,134,549 A * 10/2000 Regnier et al. ............. 345/753
6,161,139 A * 12/2000 Win et al. ................... 709/225
6,272,467 B1 *  8/2001 Durand et al. ................. 705/1

* cited by examiner

Primary Examiner—Luke S Wassum
Assistant Examiner—Leslie Wong
(74) Attorney, Agent, or Firm—David W. Victor; Konrad Raynes & Victor LLP

(57) ABSTRACT

A profiling system and method for controlling access to a plurality of objects located in at least one electronic database for a plurality of users where the profiling system includes a first plurality of records, each record having a predetermined number of attributes and each of the plurality of users having only a single record in the first plurality of records. The profiling system also including a second plurality of records where each record of the second plurality of records corresponds to one of the plurality of users and at least one attribute of each record of the second plurality of records defines access control for at least one of the plurality of objects located in the at least one electronic database.

39 Claims, 3 Drawing Sheets

Extension Component Database With Additional Object Access Control Data

| Attribute key/Value | Value |
|---|---|
| role:Role1 | Function1 |
| role:Role1 | Function2 |
| role:Role3 | Function1 |
| role:Role3 | Function3 |
| role:Role3 | Function4 |
| site location:New York | Site2 |
| site location:New York | Site3 |
| role:Role4 | Function1 |
| role:Role4 | Function3 |

Vertical Component Database With User Identification, Preference, And Basic Security Data

| Attributes | Value | Value | Value |
|---|---|---|---|
| Username | user1 | user2 | user3 |
| Password | ****** | ******* | ******* |
| First Name | Name1 | Name2 | Name3 |
| Last Name | Last1 | Last2 | Last3 |
| E-mail | name1@isp.com | name2@isp.com | name3@isp.com |
| Phone Number | 111-555-1212 | 222-555-1212 | 333-555-1212 |
| FAX | 111-555-1213 | 222-555-1213 | 333-555-1213 |
| Cell Phone | 111-555-1214 | 222-555-1214 | 333-555-1214 |
| Pager | 111-555-1215 | 222-555-1215 | 333-555-1215 |
| Address | 1 Main Street | 2 Main Street | 3 Main Street |
| City | City1 | City2 | City3 |
| State | State1 | State2 | State3 |
| ZIP | 11111 | 22222 | 33333 |
| Country | USA | USA | USA |
| Channel | OEM | OEM | OEM |
| Company | Company A | Company B | Company C |
| Company A Internal | YES | NO | NO |
| Background Color | White | Green | Orange |
| Split Screen | NO | YES | YES |
| Row Color | Blue | White | Green |
| DATA | | | |
| Files | | | |
| Favorites | | | |
| Number of Logins | 24 | 5 | 11 |
| Last Login | 02/11/2000 | 01/04/2000 | 01/17/2000 |
| Number of Logins (Reset) | 1 | 0 | 1 |
| Number of Login Failures | 0 | 0 | 0 |
| Manager's Name | Boss A | Boss B | Boss C |
| Manager's E-Mail | bossa@isp.com | bossb@isp.com | bossc@isp.com |
| Manager's Phone | 444-555-1212 | 555-555-1212 | 666-555-1212 |

FIG. 1

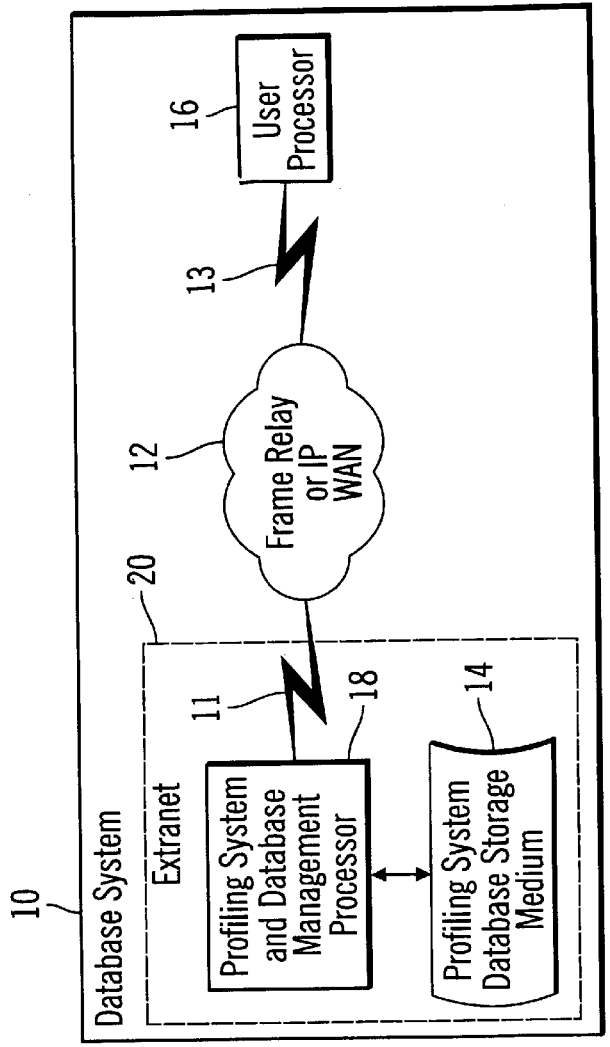

Horizontal Component Database With Object Access Control Data

| User Name | Group | Geographic Area | Site Location | Company | Access | Role |
|---|---|---|---|---|---|---|
| user1 | SSD | NA | San Jose | Company A | Read-Only | Role1 |
| user1 | MD | NA | Burlington | Company A | Read-Only | Function1 |
| user2 | XX | SA | Columbia | Company B | Read/Write | Role4 |
| user3 | YY | NA | New York | Company A | Read-Only | Role1 |
| user3 | YY | NA | Atlanta | Company C | Read/Write | Role3 |

FIG. 2

Extension Component Database With Additional Object Access Control Data

| Attribute key/Value | Value |
|---|---|
| role:Role1 | Function1 |
| role:Role1 | Function2 |
| role:Role3 | Function1 |
| role:Role3 | Function3 |
| role:Role3 | Function4 |
| site location:New York | Site2 |
| site location:New York | Site3 |
| role:Role4 | Function1 |
| role:Role4 | Function3 |

PROFILING SYSTEM FOR CONTROLLING ACCESS FOR A PLURALITY OF USERS TO A PLURALITY OF OBJECTS LOCATED IN AT LEAST ONE ELECTRONIC DATABASE

BACKGROUND OF THE INVENTION

1. Field of the Invention

This invention relates to profiling systems, in particular, to profiling system employed to control access to objects located in one or more electronic databases.

2. Description of Related Art

Profiling systems have been developed to control access to objects located in electronic databases. The profiling systems commonly create and maintain profiles of users who are entitled to some level of access to objects in the electronic databases controlled by the system. The access to the object may be read-only or viewing access, limited modify or write access, or full access to read and write (view or modify) access to one or more objects in the databases.

Each profiling system generally includes a profile database, the profile database having a number of access records. Each access record may detail user access rights to objects located in databases whose access thereto is controlled by the profiling system. Accordingly, a profiling system may be employed to control one or more databases located on a single computer, network of computers, or network of network of computers (commonly called the Internet). For example, many companies have established Intranets, which are private, controlled access databases accessible via the Internet. In this case, an Intranet profiling system may include a record with a fixed number of attributes (or fields) for each employee or user entitled to access objects within the databases of the Intranet.

The attributes commonly represent three types of user data: security, identification, and preference. The security data is used to condition user access to or modification capabilities of one or more objects located in the databases of the Intranet. The identification data is primarily used for contact information. The preference data reflects application specific preferences for user where the application may be used to view or modify selected objects.

The security data information stored in each record ideally enables the profiling system to vary the level of access to objects altogether, in groups, or individually from employee to employee (or user to user). When a user needs multiple types of access or access to different objects in the profiling system, a second record may be added to the profiling database where the second record contains different security data for the user that enables the additional object access or modification capabilities. Because each record in the profiling system database has a fixed number of attributes the attributes related to user identification and user preference would be either duplicative or left empty. In such a case, the profiling database may contain duplicative information or unused data space. Multiple records for a user may also increase the profile system overhead, in particular when the system attempts to resolve whether a user can access or modify a particular object. Additionally, maintenance of records within the profile database would be complex.

With the advent of Extranets, the number of records required per user in the profile system may increase further. In order to provide an Extranet user access to an object located in a foreign Intranet, the Intranet profiling system would need to include security data that gives the user access to the needed object. For example, an employee of Company A may require access to an object located in a database of the Intranet of Company B (such as legitimate access to a report) where an Extranet is formed between the Intranet of Company A and B. Presently, the profiling system for the Intranet of Company B would need to include security data for the employee of Company A that enables the employee to have access to the object (such as a report) located in a database of the Intranet of Company B. This may cause replication of user information across several profiling systems. Consequently, a need exists for a profiling system that enables users to obtain access to different objects or different forms of access to objects in databases while not requiring duplicate information to be stored within a database of the profiling system.

SUMMARY OF THE INVENTION

The present invention includes a profiling system and method for controlling access for a plurality of users to a plurality of objects located in at least one electronic database. The system uses and the method analyzes a first and second plurality of records to condition access to the plurality of objects. The first plurality of records includes a single record for each of the plurality of users and each record has a predetermined number of attributes. Each record of the second plurality of records is linked to one of the first plurality of records corresponding to one of the plurality of users. In addition, each record of the second plurality of records has at least one attribute defining access control for at least one of the plurality of objects.

In a preferred embodiment, the profiling system also uses and the method analyzes a third plurality of records to condition access to the plurality of objects. In this embodiment, each record of the third plurality of records is linked to at least one of the second plurality of records. Also each record of the third plurality of records has at least one attribute further defining access control for the user for at least one of plurality of objects. In a further embodiment each record of the third plurality of records is also linked to the at least one attribute of the corresponding record of the second plurality of records.

It is also noted that at least one attribute of each record of the first plurality of records may also define or determine access control for at least one of plurality of objects. Further, at least one attribute of each record of the first plurality of records may include preference data for the user. Also at least one attribute of each record of the first plurality of records may include identification data for the user.

Each of the above embodiments may be used to control access to objects located in an electronic database on an Extranet. Further the first plurality of records and the second plurality of records may be located on an Extranet.

In a preferred embodiment, each record of the plurality of records of the second database has a predetermined number of attributes. In addition, each record of the plurality of records of the third database corresponds to an attribute of the second plurality of records that it is linked thereto.

BRIEF DESCRIPTION OF THE DRAWINGS

FIG. 1 is diagram of an exemplary vertical component database for use in a profiling system in accordance with the present invention.

FIG. 2 is a diagram of an exemplary horizontal component or security matrix database for use in a profiling system in accordance with the present invention.

FIG. 3 is a diagram of an exemplary extension component database for use in a profiling system in accordance with the present invention.

FIG. 4 is a diagram of exemplary data distribution system that may include an electronic database and profiling system in accordance with the present invention.

Like reference numbers and designations in the various drawings indicate like elements.

DETAILED DESCRIPTION OF THE INVENTION

Figure 5:
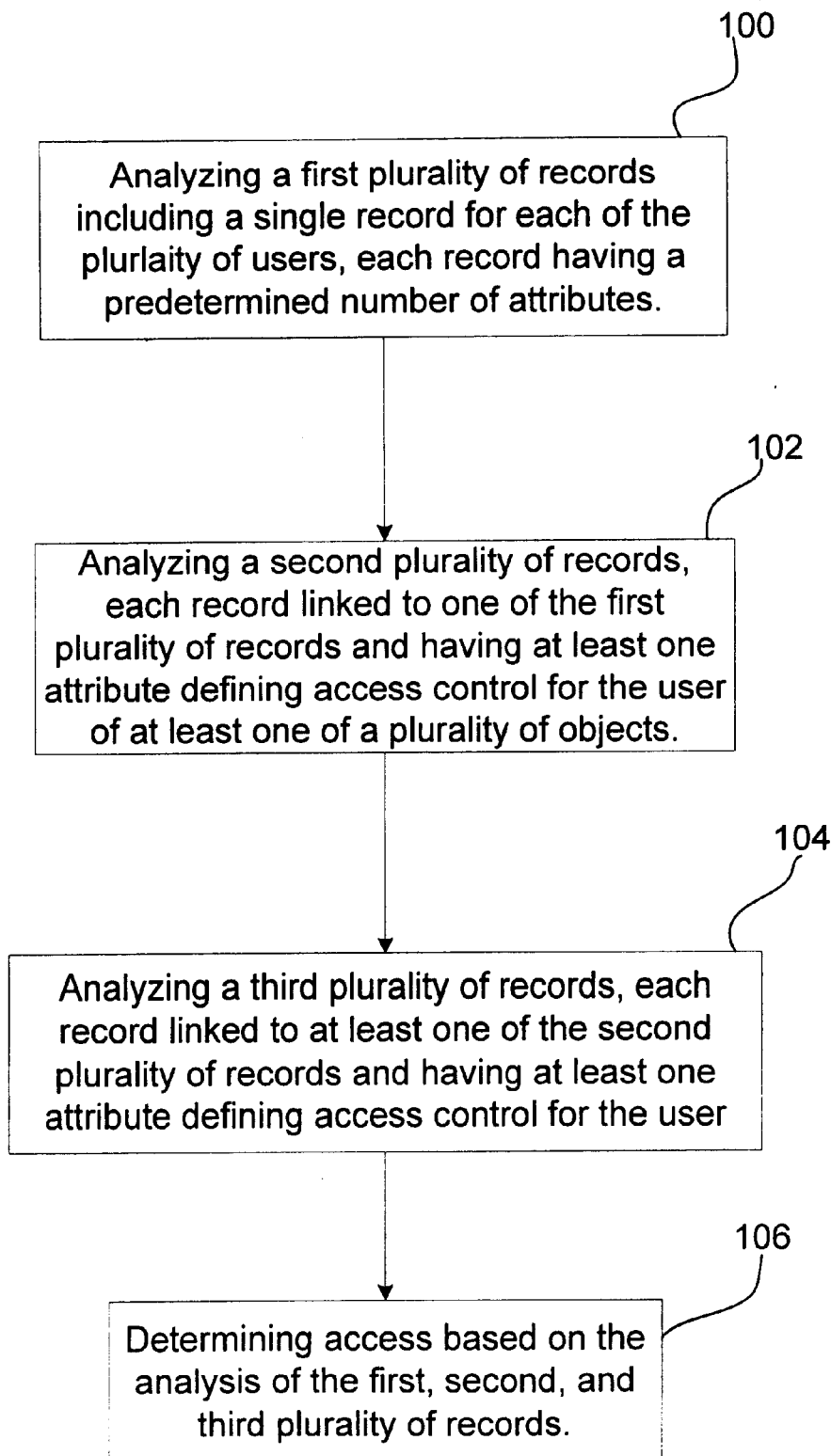
FIG. 5 is a diagram illustrating operations performed to process the component databases in a profiling system to determine access for a user in accordance with the present invention.

Throughout this description, the preferred embodiment and examples shown should be considered as exemplars, rather than as limitations on the present invention.

As noted above, in order to provide an Extranet user access to an object located in a foreign Intranet, the Intranet profiling system would need to include security data that gives the user access to the needed object. To reduce the replication of profile records across Intranets, an Extranet profiling system may be used. In the Extranet profiling system the profiling database may include records for users from different companies. To enable a user from Company A to have access to an object in a database in Company's B Intranet, however, the user still needs to have a record in the Extranet profiling system that indicates that the user has such access. Further the number of records for a user may increase as the user is given limited access to additional objects in databases in an Extranet, Intranet, or any electronic database system.

The present invention is a profiling system that employs multiple databases as shown in FIGS. 1–3 to more efficiently control access to objects in one or more databases. The profiling system may be employed in a database system such as the exemplary database system 10 shown in FIG. 4. As shown in FIG. 4, the database system 10 includes a user processor 16, profiling system and database management processor 18, electronic database and profiling system database storage medium 14, and communication system 12. A user via user processor 16 may request access to an object located in an electronic database stored in medium 14. The request is transmitted to processor 18 via communication system 12.

Communication system 12 may be any interconnection between two processors. The communication system 12 is coupled to the processors 16 and 18 by communication links 13 and 11. The communication links 11 and 13 may vary as a function of the communication system 12. For example, the communication system may be a Frame relay network or Internet Protocol ("IP") wide area network ("WAN"). In such either case, the communication links 11 and 13 may be an Ethernet connection, direct switched network, or an Internet Service Provider ("ISP") connection.

The profiling system processor 18 and profiling system database storage medium 14 may be located within an Extranet 20 as discussed above.

The profiling system processor 18 receives the requests for access to an object that is controlled by the profiling system via the communication link 11. The profiling system then determines whether to grant the user access to an object by retrieving one or more profile system database records that correspond to the user and object to be accessed where the profile system database records are similar to those shown in FIGS. 1–3 (and described below). Once the profiling system determines (or resolves) that the user is entitled to the requested form of access for the object, the user is granted such access. The profiling system databases may be stored in the storage medium 14 (where the medium 14 may be a magnetic disk drive, optical storage system, or any other electronic storage medium) that is directly coupled to the processor 18 as shown in FIG. 4 or any other storage medium coupled to the processor 18 via the communication link 11 or another communication link. In addition, the profiling system databases as described below may be stored in different storage mediums.

In addition, the objects that the profiling system controls access thereto may also be stored in the storage medium 14 or any other storage medium coupled to the processor 18 via the communication link 11 or another communication link. It is further noted that in such embodiments, there may be redundant profiling systems and profiling databases. This may be necessary to prevent a single profiling system from receiving too many requests for access to objects controlled by the profiling system. The profiling system database structure of the present invention, as explained below, enables such redundancy without significant maintenance overhead.

As noted above, FIGS. 1–3 are diagrams of exemplary database structures for a profiling system and method in accordance with the present invention. FIG. 1 is diagram of an exemplary vertical component database. FIG. 2 is a diagram of an exemplary horizontal component or access Matrix database and FIG. 3 is a diagram of an exemplary extension component database. In an exemplary profiling system, the vertical component database includes user identification, preference, and basic security data. The horizontal component or access matrix database includes object access control data and the exemplary extension component database includes additional object access control data for one or more attributes or fields of the access matrix database.

As shown in FIG. 1, the vertical component database has a single record per user with a fixed number of attributes or fields per record (or user). In this example, there are thirty attributes per record, the attributes comprising identification, preference, and basic security/access data for each user. The number of attributes per vertical component record and particular identification, preference, and basic security attributes may vary for each profiling system. In the example shown in FIG. 1, the attributes "First Name" to "Zip" and "Manager's Name" to "Manager's Phone" are primarily identification attributes. The attributes "Background Color", "Split Screen", and "Row Color" are user preference attributes. Further the attributes "DATA" to "Number of Login Failures" are security attributes. The attributes "Country" to "Company A Internal" are a combination of identification and security/access attributes. For example, the user's Channel attribute may be used in part to identify the user and, in part to condition access to an object located in an electronic database.

In the example shown in FIG. 1, the security attributes, DATA to Number of Login Failures are not attributes used to condition access to objects. As noted, however, attributes Country to Company A Internal are a combination of identification and security/access attributes. Thus, some attributes of the vertical component may be used, in part to condition access to objects in an electronic database. These attributes are normally temporally fixed for a user (i.e., not subject to frequent change) whereas, as discussed below with reference to FIG. 2, other conditional access attributes may vary, be modified, or removed more frequently. In addition, the attributes in the vertical component database are general access condition attributes, i.e., they may be used to control or condition access to a group or large set of objects rather than a particular object or small group of objects stored in an electronic database.

In the preferred embodiment, access control attributes (attributes used to condition access to objects) that are more time variable or more object specific are stored in an access Matrix database such as the exemplary database shown in FIG. 2. As shown in this FIGURE, a user may have a variable number of records in the Matrix database. Each record in this database is linked to a corresponding user record in the vertical component database. In this example, each record of the Matrix (or horizontal component) database is linked to a record of the vertical database by the attribute "User name". In the preferred embodiment, the second level database or Matrix database also has a fixed number of attributes; in this case seven attributes. As noted, the attribute User name is used to link each record of the Matrix database to a corresponding record in the vertical component database. Each other attribute, "Group" to "Role" is a conditional access attribute, i.e., each attribute may be used to control user access to one or more objects located in an electronic database controlled by the profiling system.

In the Matrix database the attributes may control access to a specific object or group of objects. Note, for example the fourth record in the database for user3, identified as associated with Company C in the vertical component database. The user has a "Company" attribute in the Matrix database equal to "Company A", an "Access" attribute equal to "Read-Only", and a "Role" attribute equal to "Role1". Thus, user3 has conditional Read-Only access to Company A objects for the Role "Role1" where as explained below with reference to FIG. 3, users having the value "Role1" for the Role attribute may access the objects for Function1 and Function2.

As noted, in this exemplary Matrix database the attribute "Role" may be used to further define or control access to objects, i.e., beyond read, write, or read and write access based on the attributes Company, Site Location, Geographic Area, and Group. For example, the Matrix database may be used to control information about items for sale and the attribute "Role" may define a user's function with respect to the items for sale as relates to the other attributes of the Matrix database, i.e., the user's Group, Geographic Area, Site Location, Company, and Access. For example, the attribute "Role" may be assigned the value "Role1" for users who are authorized purchasers of the items for sale (subject to the other attributes of the Matrix database.) Thus, "Role1" represents "purchasers", "Role3" may represent "distributors", and "Role4" may represent "shipping agents".

Accordingly, users having such Role attributes may ideally has access control to several types of information related to the items for sale, i.e., each Role value may represent one or more access control functions. For example, users having the value "Role1" for the attribute Role (corresponding to purchasers), may ideally have access control for at least two functions: "Function1" to "view inventory status about items for sale" and "Function2" to "purchase items for sale". Thus, the attribute Role may represent more than one or more access control functions for objects. Users assigned a different Role value may ideally have different access control functions. For example, users assigned "Role3" (distributors), may ideally have access control for three functions: "Function1" to "view inventory status about items for sale", "Function3" to "check invoice status", and "Function4" to "modify an invoice". Users assigned "Role4" (shipping agents), may ideally have access control for two functions: "Function1" to "view inventory status about items for sale" and "Function3" to "check invoice status".

Finally, in some circumstances a user may be assigned only one function, such as user1 for the Group "MD", Site Location "Burlington" (the second record of the Matrix database). In such a case, the attribute Role for this record in the Matrix database is set to single function assigned to the user, in this example "Function1" (view inventory status about items for sale). Thus, user1 is limited to view inventory status about items for sale as relates to the other attributes of this record of the Matrix database. As noted above, the attribute "Role" in this exemplary embodiment may be used to denote one or more access control functions that a user having the other attributes of the record is entitled. In order to provide multiple access control functions as presented above, either a separate record for each such function would be needed in the Matrix database, i.e., for user3 having access control functions Function1, Function3, and Function4 the Matrix database may need three records for the user or the functions related to the value "Role3" must be defined.

In a preferred embodiment of the invention, an extension database is used where each record of the extension database is correlated to a value of an attribute in the Matrix database that may represent one or more control access functions. An example of such of an extension database is shown in FIG. 3. As shown in this FIGURE, each record of the database has two attributes. The first attribute links the record of the extension database to a particular attribute and particular attribute value of the access Matrix database. For example, Company A may want user3 (assigned the Role "Role1" (purchaser)) to have two types of access control: Function1 (to view inventory status) and Function2 (to be able to purchase items). Instead of having two records in the Matrix database where the only the Role attribute changes from the value "Function1" to "Function2", a single record (record four in this case) of the Matrix has the attribute Role set to the value "Role1". In the exemplary extension database, the attribute Role set to the value "Role1" correlates to two records and thus two access control values. In particular, the attribute Role set to the value "Role1" corresponds to the first and second record of the extension database and thus to the access control functions "Function1" and "Function2".

Similarly, in the exemplary extension database shown in FIG. 3, the attribute Role set to the value "Role3" correlates to three records and thus three access control values. In particular, the attribute Role set to the value "Role3" corresponds to the third, fourth and fifth record of the extension database and thus to the access control functions "Function1", "Function3" and "Function4". Likewise, the attribute Role set to the value "Role4" correlates to two records and thus two access control values. In particular, the attribute Role set to the value "Role4" corresponds to the eighth and the ninth record of the extension database and thus to the access control functions "Function1" and "Function3".

As noted above, each record of the extension database is correlated to a value of an attribute of the Matrix database to define access control for the value of the attribute. Accordingly, a record of the extension may be correlated to attributes other than the Role attribute. For example, records six and seven of the extension database are correlated to the Site Location attribute having the value "New York" and define access control for Site Location attribute of the Matrix database having this value. In this example, the site location attribute with the value "New York" corresponds to the values "Site2" and "Site3" where these values define access to one or more objects. Site2 may represent "Armonk" and Site3 may represent "New York City". Accordingly user3 of the Matrix database having site location "New York" may be further limited to the sites "Armonk" and "New York City". Accordingly, it is to be understood that the invention is not to be limited by the specific illustrated embodiment, but only by the scope of the appended claims.

FIG. 5 illustrates operations performed by the profiling system and database management processor 18 to control access to a plurality of users to a plurality of objects located in at least one electronic database. At block 100, the profiling system and database management processor 18 analyzes a first plurality of records including a single record for each of the plurality of users, where each record has a predetermined number of attributes. The profiling system and database management processor 18 further analyzes at block 102 a second plurality of records, where each record is linked to one of the first plurality of records and has at least one attribute defining access control for the user of at least one of a plurality of objects. The profiling system and database management processor 18 also analyzes at block 104 a third plurality of records, where each record is linked to at least one of the second plurality of records and has at least one attribute defining access control for the user. The profiling system and database management processor 18 then determines at block 106 access based on the analysis of the first, second, and third plurality of records.

While this invention has been described in terms of a best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution.

What is claimed is:

1. A profiling system for controlling access for a plurality of users to a plurality of objects located in at least one electronic database, the system comprising:
   a) a first plurality of records including a record for each of the plurality of users, each record having a predetermined number of attributes;
   b) a second plurality of records, each record of the second plurality of records linked to one of the first plurality of records and having at least one attribute defining at least one of a plurality of objects located in the at least one electronic database that the user may access; and
   c) a third plurality of records, wherein each record indicates an attribute of user access control, wherein one of the third plurality of records is linked to one of the second plurality of records to limit the user access control as indicated in the linked one of the third plurality of records to the database object indicated in the linked one of the second plurality of objects.

2. The profiling system according to claim 1, wherein at least one attribute of the predetermined number of attributes of each record of the first plurality of records defines access control for the user for the at least one of plurality of objects located in the at least one electronic database.

3. The profiling system according to claim 2, wherein at least one attribute of the predetermined number of attributes of each record of the first plurality of records includes preference data for the user.

4. The profiling system according to claim 3, wherein at least one attribute of the predetermined number of attributes of each record of the first plurality of records includes identification data for the user.

5. The profiling system according to claim 1, wherein the at least one electronic database is located on an Extranet.

6. The profiling system according to claim 1, wherein the first plurality of records are located in a first database and the second plurality of records are located in a second database.

7. The profiling system according to claim 6, wherein the first database and the second database are located on an Extranet.

8. A method of controlling access for a plurality of users to a plurality of objects located in at least one electronic database, the method comprising:
   a) analyzing a first plurality of records including a record for each of the plurality of users, each record having a predetermined number of attributes;
   b) analyzing a second plurality of records, each record of the second plurality of records linked to one of the first plurality of records and having at least one attribute defining at least one of a plurality of objects located in the at least one electronic database that the user may access;
   c) analyzing a third plurality of records, wherein each record indicates an attribute of user access control, wherein one of the third plurality of records is linked to one of the second plurality of records to limit the user access control as indicated in the linked one of the third plurality of records to the database object indicated in the linked one of the second plurality of objects; and
   d) determining access based on the analysis of the first, second, and third plurality of records.

9. The method according to claim 8, wherein at least one attribute of the predetermined number of attributes of each record of the first plurality of records defines access control for the user for the at least one of plurality of objects located in the at least one electronic database.

10. The method according to claim 9, wherein at least one attribute of the predetermined number of attributes of each record of the first plurality of records includes preference data for the user.

11. The method according to claim 10, wherein at least one attribute of the predetermined number of attributes of each record of the first plurality of records includes identification data for the user.

12. An article of manufacture for use in controlling access for a plurality of users to a plurality of objects located in at least one electronic database, the article of manufacture comprising computer readable storage media including program logic embedded therein that causes control circuitry to perform:
   a) analyzing a first plurality of records including a record for each of the plurality of users, each record having a predetermined number of attributes;

b) analyzing a second plurality of records, each record of the second plurality of records linked to one of the first plurality of records and having at least one attribute defining at least one of a plurality of objects located in the at least one electronic database that the user may access;

c) analyzing a third plurality of records, wherein each record indicates an attribute of user access control, wherein one of the third plurality of records is linked to one of the second plurality of records to limit the user access control as indicated in the linked one of the third plurality of records to the database object indicated in the linked one of the second plurality of objects; and d) determining access based on the analysis of the first, second, and third plurality of records.

13. The article of manufacture for use in controlling access for a plurality of users to a plurality of objects located in at least one electronic database according to claim 12, wherein at least one attribute of the predetermined number of attributes of each record of the first plurality of records defines access control for the user for the at least one of plurality of objects located in the at least one electronic database.

14. The article of manufacture for use in controlling access for a plurality of users to a plurality of objects located in at least one electronic database according to claim 13, wherein at least one attribute of the predetermined number of attributes of each record of the first plurality of records includes preference data for the user.

15. The article of manufacture for use in controlling access for a plurality of users to a plurality of objects located in at least one electronic database according to claim 14, wherein at least one attribute of the predetermined number of attributes of each record of the first plurality of records includes identification data for the user.

16. The profiling system of claim 1, wherein the second plurality of records includes a plurality of records associated with one user corresponding to the linked one of the first plurality of records, wherein the plurality of second plurality of records associated with one user identify different database objects the user may access.

17. The profiling system of claim 16, wherein at least two records of the second plurality of records associated with one user identify database objects at different geographical locations.

18. The profiling system of claim 16, wherein at least two records of the second plurality of records associated with one user identify database objects for different companies.

19. The profiling system of claim 1, wherein the user access control indicated in the third plurality of records specifies a function a user may perform with respect to a database.

20. The profiling system of 19, wherein each specified function indicates an operation the user may perform with respect to the database object indicated in the one of the second plurality of records linked to the one of the third plurality of records indicating the specified function.

21. The profiling system of claim 20, wherein the database object includes records of items for sale, and wherein the functions indicated in the third plurality of records that are capable of being linked to the second plurality of records identifying the database objects include: purchase items identified in records in the database object; view inventory status for items identified in records in the database object; and modify an invoice for items identified in records in the database object.

22. The profiling system of claim 20, wherein multiple of the third plurality of records are capable of being linked with a plurality of the second plurality of records associated with one user to define functions the user may perform with respect to the database objects indicated in the linked second plurality of records.

23. The profiling system of claim 1, wherein the attribute of user access control indicated in one of the third plurality of records specifies a geographic location to which the user is restricted, wherein the user may only access a database object identified in one second plurality of records at the geographic location identified in the one third plurality or records linked to the one second plurality of records identifying the database object.

24. The method of claim 8, wherein the second plurality of records includes a plurality of records associated with one user corresponding to the linked one of the first plurality of records, wherein the plurality of second plurality of records associated with one user identify different database objects the user may access.

25. The method of claim 24, wherein at least two records of the second plurality of records associated with one user identify database objects at different geographical locations.

26. The method of claim 24, wherein at least two records of the second plurality of records associated with one user identify database objects for different companies.

27. The method of claim 8, wherein the user access control indicated in the third plurality of records specifies a function a user may perform with respect to a database.

28. The method of claim 27, wherein each specified function indicates an operation the user may perform with respect to the database object indicated in the one of the second plurality of records linked to the one of the third plurality of records indicating the specified function.

29. The method of claim 28, wherein the database object includes records of items for sale, and wherein the functions indicated in the third plurality of records that are capable of being linked to the second plurality of records identifying the database objects include: purchase items identified in records in the database object; view inventory status for items identified in records in the database object; and modify an invoice for items identified in records in the database object.

30. The method of claim 28, wherein multiple of the third plurality of records are capable of being linked with a plurality of the second plurality of records associated with one user to define functions the user may perform with respect to the database objects indicated in the linked second plurality of records.

31. The method of claim 8, wherein the attribute of user access control indicated in one of the third plurality of records specifies a geographic location to which the user is restricted, wherein the user may only access a database object identified in one second plurality of records at the geographic location identified in the one third plurality or records linked to the one second plurality of records identifying the database object.

32. The article of manufacture of claim 12, wherein the second plurality of records includes a plurality of records associated with one user corresponding to the linked one of the first plurality of records, wherein the plurality of second plurality of records associated with one user identify different database objects the user may access.

33. The article of manufacture of claim 32, wherein at least two records of the second plurality of records associated with one user identify database objects at different geographical locations.

34. The article of manufacture of claim 32, wherein at least two records of the second plurality of records associated with one user identify database objects for different companies.

35. The article of manufacture of claim 12, wherein the user access control indicated in the third plurality of records specifies a function a user may perform with respect to a database.

36. The article of manufacture of claim 35, wherein each specified function indicates an operation the user may perform with respect to the database object indicated in the one of the second plurality of records linked to the one of the third plurality of records indicating the specified function.

37. The article of manufacture of claim 36, wherein the database object includes records of items for sale, and wherein the functions indicated in the third plurality of records that are capable of being linked to the second plurality of records identifying the database objects include: purchase items identified in records in the database object; view inventory status for items identified in records in the database object; and modify an invoice for items identified in records in the database object.

38. The article of manufacture of claim 36, wherein multiple of the third plurality of records are capable of being linked with a plurality of the second plurality of records associated with one user to define functions the user may perform with respect to the database objects indicated in the linked second plurality of records.

39. The article of manufacture of claim 12, wherein the attribute of user access control indicated in one of the third plurality of records specifies a geographic location to which the user is restricted, wherein the user may only access a database object identified in one second plurality of records at the geographic location identified in the one third plurality or records linked to the one second plurality of records identifying the database object.

* * * * *

UNITED STATES PATENT AND TRADEMARK OFFICE
CERTIFICATE OF CORRECTION

PATENT NO. : 6,931,402 B1 Page 1 of 1
APPLICATION NO. : 09/514227
DATED : August 16, 2005
INVENTOR(S) : Manuel Vasconcelos Pereira, III It is certified that error appears in the above-identified patent and that said Letters Patent is hereby corrected as shown below:

Column 7

Lines 57 and 65, delete "of objects" and insert -- of database objects --.

Column 8

Lines 4 and 44, delete "the database" and insert -- the at least one database --.

Lines 5 and 45, delete "plurality of objects" and insert -- plurality of records --.

Line 9 and 51, delete "of plurality of objects" and insert -- of the plurality of database objects --.

Lines 28, 36, and 62, delete "of objects" and insert -- of database objects --.

Column 9

Line 4, 17, 25, and 31, delete "of objects" and insert -- of database objects --.

Line 13, delete "plurality of objects" and insert -- plurality of records --.

Line 22, delete "plurality of objects" and insert -- the plurality of database objects --.

Signed and Sealed this

Twenty-fifth Day of December, 2007

JON W. DUDAS
*Director of the United States Patent and Trademark Office*